United States Patent [19]

Perry et al.

[11] Patent Number: 4,581,712
[45] Date of Patent: Apr. 8, 1986

[54] ROOF PRESSURE MONITORING SYSTEM

[76] Inventors: Huey J. Perry, 2980 Staunton Rd., Huntington, W. Va. 25702; Billy R. Bruce, 526 10th Ave., West, Huntington, W. Va. 25701

[21] Appl. No.: 440,574

[22] Filed: Nov. 10, 1982

[51] Int. Cl.⁴ .......................... G01N 7/00; E21C 41/00
[52] U.S. Cl. ...................................... 364/558; 73/784; 299/1; 364/420
[58] Field of Search ............... 364/181, 420, 558, 505; 299/1; 405/302, 291; 340/690, 666, 686, 825.06; 73/784

[56] References Cited

U.S. PATENT DOCUMENTS

| | | | |
|---|---|---|---|
| 3,111,655 | 11/1963 | Kotarsky et al. | 73/784 |
| 3,427,876 | 7/1966 | Steele et al. | 73/784 |
| 3,646,553 | 2/1972 | Conkle | 73/784 |
| 3,949,353 | 4/1976 | Waters et al. | 340/690 |
| 4,066,992 | 1/1978 | Buller et al. | 299/1 |
| 4,136,556 | 1/1979 | Graham | 73/784 |
| 4,217,849 | 8/1980 | Brown et al. | 73/784 |
| 4,271,407 | 6/1981 | Kehrman et al. | 340/690 |
| 4,400,694 | 8/1983 | Wong et al. | 340/825.06 |

Primary Examiner—Errol A. Krass
Attorney, Agent, or Firm—Sherman Levy

[57] ABSTRACT

A mine safety system and method of measuring and monitoring the mine roof support stress levels. The information which is continuously gathered is recorded and stored so that a substantially complete history of each selected roof bolt is available to mine management personnel so that a determination may be made as to what action should be taken to protect the safety of the people working in the mine.

1 Claim, 3 Drawing Figures

ROOF PRESSURE MONITORING SYSTEM

TECHNICAL FIELD

This invention relates generally to mine safety systems and apparatuses and relates specifically to a system and apparatus for continuously measuring and monitoring the stress levels being applied to the mine roof supports such as roof bolts, support columns, and the like so that appropriate action may be taken to ensure the safety of the miners as well as to prevent damage to the equipment within the mine.

BACKGROUND ART

In the past, some effort has been made to provide an alarm or the like which will warn miners and mine operators that some portion of a mine structure has made a substantial change or shift in the strata, and normally the alarm is activated after the change or shift has occurred. Also, the alarm ordinarily is either in an "on" condition or an "off" condition and does not signal an impending change nor shift in the geological structure of the mine. These alarms may be mounted on the roof supports which extend from the floor to the roof of the mine or may be attached to conventional roof support bolts which are embedded within the strata above the top of the mine.

Some examples of this type of structure are disclosed in U.S. Pat. Nos. 3,111,655 to Kortarsky, et al and 4,156,236 to Conkle.

Additional efforts, such as disclosed in U.S. Pat. No. 4,066,992 to Butler et al, have been made to provide a continuous surveillance system on the seismic disturbances in and around the mine in an effort to determine when a disturbance of sufficient magnitude to cause damage to the mine will occur.

DISCLOSURE OF THE INVENTION

The present invention is embodied in a roof pressure monitoring system which continuously monitors the pressure loading on various roof bolts and roof supports throughout the mine and will record the time of the change in pressure loading as well as the amount of change to indicate that certain conditions have altered in some areas of the mine so that the mine operators may take preventive steps to avoid injury and loss of life of the miners or damage to expensive mine equipment. Changes in either positive or negative pressure loading are monitored. A positive change may indicate that the load on one or more roof bolts is increasing and may reach a point exceeding the capacity of the bolts to support the roof. A negative change may indicate that the anchor of a roof bolt is losing its hold and may be providing no roof support. A positive change in one bolt and a negative change in an adjacent bolt may indicate uneven holding strength of the roof bolts.

In the system, selected roof bolts are provided with sensors, and several of such sensors are connected to an associated or near-by module which in turn is connected to adjacent modules and to a host computer which collects data from the modules, records the data on a storage media and provides a printout of significant changes in the sensors.

It is an object of the invention to provide a mine safety system which monitors the roof supports throughout the mine and provides a printout of significant changes in the pressure loadings so that safety steps and preventive steps may be taken prior to a mine accident or roof cave-in.

DESCRIPTION OF THE PREFERRED EMBODIMENT

Figure 1:
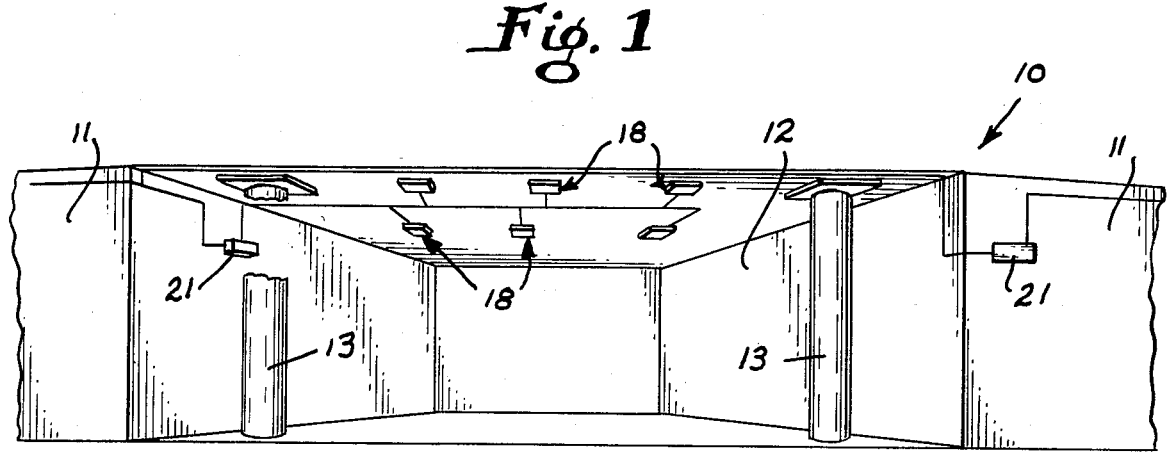
FIG. 1 is a schematic perspective view of the system installed in a mine.
Figure 2:
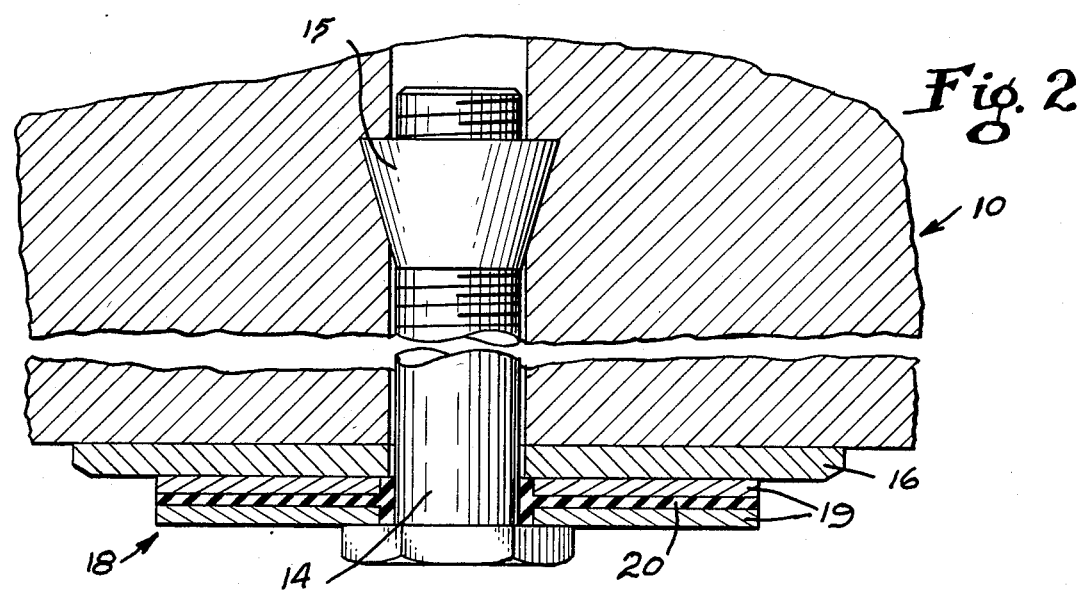
FIG. 2 is a fragmentary sectional view of one of the roof bolts with a typical sensor associated therewith.
Figure 3:
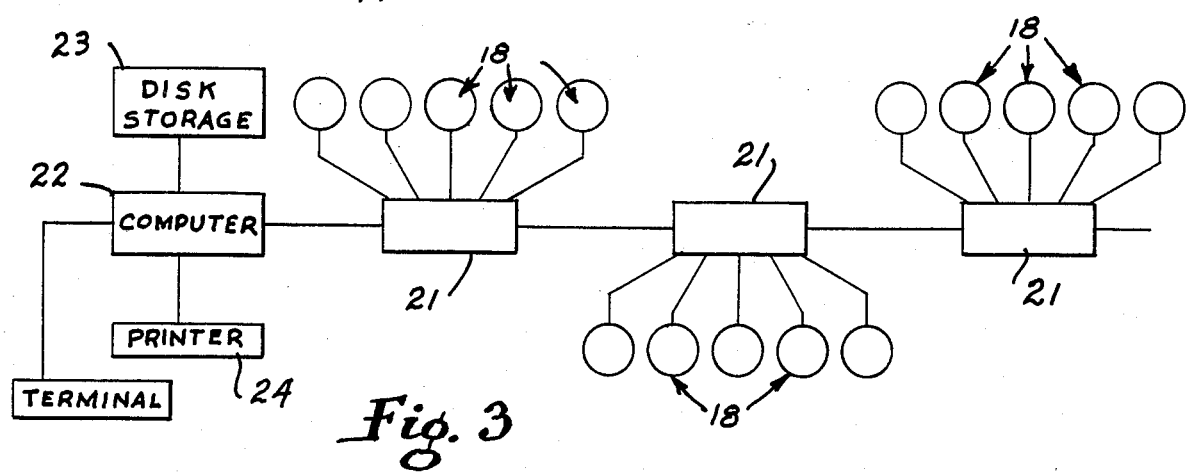
FIG. 3 is a block diagram of the system.

With continued reference to the drawing, a mine 10 normally has a plurality of tunnels 11 located at one or more levels or strata of the earth, and usually each tunnel has one or more galleries, bays or off-shoots 12 extending laterally therefrom. In order to support the roof of each tunnel and each off-shoot therefrom, it is conventional to provide a plurality of columns 13 which extend from the floor to the roof and a plurality of roof bolts 14 which extend into the stratum of earth above the roof where such bolts are threaded or otherwise connected to anchors 15 with a roof bolt plate 16 between the head of the bolt and the roof. The columns and roof bolts are intended to prevent cave-ins or the collapsing of the roof.

In the present system, a sensor 18 is associated with a selected roof bolt 15 on column 13, and such sensor may be of a commercially available device of special design for integration with this system and is located in intimate contact between the mine roof and the supporting bolt or column. It is to be understood that the sensor may be of known construction and may include a pair of spaced generally parallel plates 19 separated by a compressible dielectric 20. An axial load applied to the roof bolt causes a deflection of one or both plates 19 which may be measured as a capacitance change between such plates and is a direct reflection of the pressure load exerted on the bolt as the bolt is tightened.

It is noted that any type of device capable of converting pressure force, displaced movement, or the like may be used.

A selected number of sensors (usually four to eight sensors) are connected electrically to an on-site module 21 which includes a small dedicated computer having a processor with its program stored in ROM (Read Only Memory), input-output lines for communication, and RAM (Random Access Memory) for data storage and manipulation. Further, the module 21 includes circuitry which measures the electrical characteristics of the sensors connected thereto and converts such measurements into digital information equating to pounds of pressure. This information is transferred to memory to be compared with previous readings from the same sensors. The different sensors normally are polled by the module at predetermined intervals of time such as, for example, every ten seconds on a continuous basis.

Each of the modules 21 is connected electrically to a host computer 22 located in a remote position, such as the mine office, for a purpose which will be described later. When a change occurs in any of the sensors which exceeds a predetermined amount, the module sends the information downstream forward to the host computer 22 for further handling and decision making. The module then logs the new pressure reading in its memory and resumes normal polling until there is another pressure change occuring. Each module usually is connected to the next module closer to the host computer 22 as well as to the module next farther away to provide a "daisy-chain" arrangement of modules. Each monitor not only monitors its own sensors but relays data received from other modules.

Additionally, each module communicates an "on-line, clear" signal to the host computer 22 on a regularly scheduled basis. This may occur each half-hour or hour or the like depending upon what is found to be desirable. The purpose of this is for each module to log in periodically to confirm that it is on-line and functioning properly. Each module has its own code or identifying number so that it may be identified by the host computer when reporting in.

The host computer 22 collects data on pressure loads from throughout the areas of the mine that is deemed important. Such data is recorded on a storage media such as a magnetic disk 23 or the like. In addition to the information being transmitted from the modules 21, the host computer 22 records the day, date, and module number with the pressure load.

When the pressure load on a sensor increases or decreases a predetermined amount such as, for example, 10% such change is detected by its associated module and forwarded to the host computer. The host computers log the change in pressure for that particular sensor and stores it with all previous information regarding that sensor. When a substantial change is detected in a sensor, the host computer not only logs the new information, but it prints out a hard copy report on a printer 24 which includes a complete history of the change for that sensor and its associated bolt or support. A typical printout may look as follows:

| Module | Bolt # | Date | Time | Indicated Pressure | Change |
|---|---|---|---|---|---|
| 245 | 4 | 6/18/82 | 21:35 | 875 lbs | +78 |
| 245 | 4 | 6/22/82 | 07:14 | 962 lbs | +87 |
| 245 | 4 | 6/23/82 | 11:47 | 1,058 lbs | +96 |
| 245 | 4 | 6/23/82 | 22:06 | 1,163 lbs | +105 |

This type of report provides the mine personnel with useable information regarding the condition of the mine roof in a given area, and this information may be used in determining what action, if any, should be taken to protect the safety of the miners and to prevent roof-fall accidents within the mine. A positive change in the pressure load (as in the above example) may indicate that the strata above the roof is shifting, and additional bolts or other supports are needed in the area to prevent a possible cave-in or roof-fall of a portion of the roof. Since most roof-falls are the result of an increased build-up of pressure over a period of time, the system provides a warning substantially before the accident occurs so that preventive measures may be taken to either overcome the fault or evacuate the miners and equipment. A negative change in the pressure load may indicate that the anchor is losing its hold.

In the operation of the system, a plurality of sensors 18 are positioned throughout the mine or a portion of the mine, and such sensors are located between the roof and a portion of a roof bolt or a column. During installation, the roof bolt is torqued to a known pressure load which preferably is similar to the pressure load of other sensors. The sensors are electrically connected to an on-site module 21 which is located within the area of the sensors, and such module continuously polls the sensors to immediately determine any substantial difference in the pressure load. If no substantial change is noted, the module periodically sends a signal to the host computer 22 indicating that the module and sensors are functioning but that no substantial change in pressure load has occurred in the vicinity.

If a pressure load on one or more of the sensors occurs, the axial load is processed by the module which immediately sends a signal toward the host computer. The host computer receives the information and logs the pressure load, together with the time of occurrence, and compares the reading with previously logged readings from the same module and sensor. If the change is in excess of such predetermined amount, the information is transmitted to a printer together with a complete history of changes in pressure load and such printer prints a hard copy report which is available immediately to mine personnel so that appropriate action may be taken. The module is the part that compares current pressure to previous pressure. It will send information to the Host Computer only if it detects a sufficient change. Any time the Host Computer receives information about a bolt, it means that there has been a change in pressure sufficient to report and a printout is generated at that time.

Further, a positive change indicates that the load is increasing on a particular roof bolt which may reach a point exceeding the bolt's capacity to support the roof. A change in the negative direction indicates that the bolt's anchor is losing its hold and may be providing no roof support. In addition, the system consists of three separate parts, or subsystems, that all work together to provide useable information to the mine personnel. These parts are (1) Sensor, (2) Module, and (3) Host Computer.

The Sensor

It is to be noted that the sensor is a device which is located in the bolt pressure path in the same way as a "washer" would be. In other words, its physical characteristics require it to have an outside diameter of about ten inches, a thickness of from one inch to one-half inch, and a hole in the center through which the roof bolt passes. As the bolt is tightened, pressure is exerted on the sensor which directly reflects the pressure exerted on the bolt. The sensor may be of any suitable type and may be two plates separated by an air gap as the dielectric. The plates yield with pressure to vary the space between them, creating a change in capacitance. Another type places the two plates in closer physical proximity, and it uses a compressible dielectric that will vary its thickness with the amount of pressure exerted thereby varying the capacitance.

It is to be emphasized that the sensor can be of any possible type and, for example, the sensor may be either a washer like device placed in the bolts path, or it may be an integral part of the roof bolt plate. The sensor is a device having electrical characteristics that are varied by either changes in pressure or displacement. Thus, in effect, the sensor functions as either a pressure or displaced transducer.

The Module

Attention is directed to the fact that the module is a small dedicated computer. It has a processor with its program stored in ROM (Read Only Memory), I/O (Input/Output) lines for communication, and RAM (Random Access Memory) for data storage and manipulation. Also, the module will contain, in addition to the computer, unique circuitry which will measure the electrical characteristics of five sensors. Each sensor is placed on a different roof bolt. These measurements are then converted into digital information (numeric data), equating to pounds of pressure, then transferred to memory to be compared with previous readings from these same bolts. The different sensors will be polled by the module at some interval of time, every ten seconds or so for example.

Further, a module continuously polls its associated sensors and monitors the indicated pressure. The module will send the information forward toward the host computer for further handling and decision making when a change occurs in any of the bolts that exceeds a predetermined amount. Next, the module will then log in its memory the new pressure reading and resume normal polling until another pressure change occurs which requires that it, once again, inform the host computer.

It is to be noted that each module monitors five (or some fixed number) sensors. Wires connect each module to its associated sensors and to the next module closer to the host computer as well as the module next farther away from the host computer. In this way, a "daisy-chain" arrangement of modules is formed. Each module not only monitors its own sensors, but it relays data received from other modules. The monitors become a relay network for passing data to the host computer over great distances within a mine. In addition to the functions described above, the module will communicate an "on-line clear" signal to the host computer on a regularly scheduled basis. This may occur each half hour or once an hour, depending on what is found desirable. The purpose of this is to make sure that each module logs in periodically to confirm that it is on-line and functioning.

Each module has its own identifying number, which is set via configuration switches prior to installation so that it can be identified by the host computer when reporting in.

The Host Computer

Collection of data on bolt pressures throughout the areas in the mine where monitoring is deemed important is performed by the host computer. As previously stated, the data is collected from the bolts by the "modules" and is forwarded on to the host computer. The computer then records the pressure of each bolt on some storage media; initially this media will be magnetic disk. The computer keeps track of time of day and date on an ongoing basis. The time and date are logged in with the pressure data on each bolt. When the bolt pressure increases or decreases a predetermined amount, 10% for example, this change is detected by the module and forwarded to the computer. The computer logs this change in pressure for that particular bolt, and stores it with all the previous information on that bolt. When a change of this kind is detected, the computer not only logs the new information but it prints out a hard copy report of the computer history of change for that bolt also. As previously noted, a typical printout has been provided.

It is to be emphasized that the Roof Monitoring System, as explained in detail above, has important differences and advantages over previous attempts to provide a warning system for roof falls. Other devices previously developed attempt to warn of a falling roof by providing some kind of alarm signal when an indication of "something" happening is detected at the roof level.

Certain of the information disclosed herein is believed meaningful in anticipating a possible roof failure, and the same is believed to be of interest to an agency such as the U.S. Bureau of Mines about these problems. Thus, there is provided a system that monitors the stress on a roof at selected points and reports changes in pressure on the supporting roof bolts, reports the pressure, and reports the time which these pressure changes occur.

At the present time, no existing systems are capable of this level of monitoring and reporting. Furthermore, any system short of this level of monitoring and reporting is completely inadequate for the foregoing reasons.

With further reference to the capacitive sensor, there is illustrated mine roof bolts and mine roof parallel plates. A similar approach can be applied to timber supports and the sensor would be placed between the roof and timber.

It will be understood that after appropriate analog/digital conditioning by conventional methods, the axial loads would be processed. The module does the processing of the signal (which is not necessarily analog to digital). Individual or multiple roof support loads could be monitored by a single module. Multiple modules would be linked together throughout the mine to provide adequate roof bolt load/stress information. Further, the data from each OSM would be transmitted in digital or analog form. Current load/stress information would be easily accessible from the host computer for various mine locations. Also, the digital data base could be flexible enough to provide valuable information such as, but not limited, to the following:

1. Changes in load/stress levels to warn of excessive loads and potential roof falls.
2. Plotting of isostress countours could correlate the influence of one mining operation on another.
3. Conformance to a predetermined roof support plan could easily be evaluated without entering the mine.
4. In the event of a mine emergency, blocked—or fallen—or hazardous escapeways could be identified. Conditions leading up to the emergency could also be reviewed, as desired or required.

The roof bolt plate is standard on all roof bolts.

It is to be emphasized that the sensor may have any of a number of configurations and can be of conventional construction. Thus, the present invention is not limited to any specific type of sensor.

Each module may include a "dedicated computer" with memory, program, etc. A different concept in the module to lessen expense may be used. Such a later development could not be called a dedicated computer. It might simply be circuitry refined to the point that it performs this one function and nothing else, and therefore would not qualify under the term "dedicated computer."

While several embodiments of the present invention have been illustrated herein in particular detail, it will be understood that variations and modifications may be effected without departing from the spirit and scope of the novel concepts of this invention.

We claim:

1. A roof pressure monitoring system for use in a mine to anticipate and prevent roof-fall accidents and increase the safety of miners comprising a plurality of sensors located in intimate contact with the mine roof and support roof bolts securing the sensors to the mine roof, said sensors having a predetermined pressure applied thereto, a module located adjacent to at least certain of said sensors, means electrically connecting said sensors to said module, said module having means for measuring the positive and negative pressure characteristics of said sensors as compared to said predetermined pressure and converting the same characteristics into digital information of pounds and pressure, said module having a memory for storing the information and comparing the same information with previously received information and further including a small dedicated computer having a processor with a program stored in Read Only Memory and Random Access Memory, a host computer electrically connected to at least one module and being located in a position remote therefrom, said host computer receiving information from said module including an On-line clear signal on a regular basis and a signal presence indicative of changes in said pressure characteristics at the sensors, if such be the case, with reference to location, time and magnitude of change, said dedicated computer having information storage means, a printer connected to said host computer, and said printer printing a complete record of change of a sensor when the change from said predetermined pressure is greater than a predetermiend value, whereby, significant changes in pressure on said sensors are recorded indicative that a roof-fall accident may occur.

* * * * *